US009823908B2

United States Patent
Jo

(10) Patent No.: US 9,823,908 B2
(45) Date of Patent: Nov. 21, 2017

(54) APPARATUS FOR PROVIDING FRAMEWORK TO DEVELOP CLIENT APPLICATION EXECUTED ON MULTIPLE PLATFORMS, AND METHOD USING THE SAME

(71) Applicant: TMAXSOFT. CO., LTD., Gyeonggi-do (KR)

(72) Inventor: Ji Young Jo, Incheon (KR)

(73) Assignee: TMAXSOFT. CO., LTD., Gyeonggi-do (KR)

( * ) Notice: Subject to any disclaimer, the term of this patent is extended or adjusted under 35 U.S.C. 154(b) by 0 days.

(21) Appl. No.: 15/140,680

(22) Filed: Apr. 28, 2016

(65) Prior Publication Data
US 2017/0286073 A1    Oct. 5, 2017

(30) Foreign Application Priority Data
Mar. 31, 2016   (KR) .................. 10-2016-0038855

(51) Int. Cl.
*G06F 9/44*  (2006.01)
*G06F 9/45*  (2006.01)
(52) U.S. Cl.
CPC ............... *G06F 8/38* (2013.01); *G06F 8/443* (2013.01)
(58) Field of Classification Search
CPC ... G06F 8/443; G06F 8/30; G06F 8/38; G06F 8/40
See application file for complete search history.

(56) References Cited

U.S. PATENT DOCUMENTS

| | | | | |
|---|---|---|---|---|
| 6,640,249 B1* | 10/2003 | Bowman-Amuah | ..... | G06F 8/36 709/228 |
| 2002/0178290 A1* | 11/2002 | Coulthard | ......... | G06F 17/30893 709/246 |
| 2006/0123345 A1* | 6/2006 | Parimi | ...................... | G06F 8/38 715/746 |
| 2006/0212408 A1* | 9/2006 | Nuestro | ................. | G06Q 10/10 705/74 |
| 2008/0313595 A1* | 12/2008 | Boulineau | ................. | G06F 8/20 717/101 |
| 2008/0313596 A1* | 12/2008 | Kreamer | ................... | G06F 8/20 717/101 |
| 2012/0023479 A1* | 1/2012 | Moress | ..................... | G06F 8/38 717/108 |
| 2014/0223414 A1* | 8/2014 | Mau | ......................... | G06F 8/34 717/109 |

OTHER PUBLICATIONS

Son, et al. Development of Tool based on model transformation for heterogenous smartphone app, pp. 536-538,2013.

* cited by examiner

*Primary Examiner* — Chameli Das
(74) *Attorney, Agent, or Firm* — Husch Blackwell LLP

(57) ABSTRACT

A method for providing a framework to develop a client application executed on multiple platforms is disclosed. The method includes steps of: (a) an apparatus for providing a framework acquiring information on platform independent user interface (UI) and information on business logic written by using a general-purpose programming language; and (b) the apparatus performing (i) a process for generating a platform-dependent UI code corresponding to the acquired information on the platform independent UI as UI code for a target platform among the multiple platforms and (ii) a process for generating business logic code corresponding to the acquired information on the business logic as business logic code for the target platform.

12 Claims, 3 Drawing Sheets

APPARATUS FOR PROVIDING FRAMEWORK TO DEVELOP CLIENT APPLICATION EXECUTED ON MULTIPLE PLATFORMS, AND METHOD USING THE SAME

CROSS REFERENCE TO RELATED APPLICATION

This application claims priority to and incorporates herein by reference all disclosure in Korean Patent Application No. 10-2016-0038855 filed Mar. 31, 2016.

Field of the Invention

The present invention relates to an apparatus for providing a framework to develop a client application and a method using the same; and more particularly, to the apparatus for supporting the development framework used to make it easy to develop the client application that supports multiple platforms and the method using the same.

Background of the Invention

Recently, as the use of mobile devices with different operating systems has become popular, the development and the operation of applications have become more complicated. Such applications may be necessary to be operated not only on a specific platform but also on multiple platforms depending on market demand or customer requests. To allow an application to be executed on a variety of platforms such as Android, iOS, Windows 8, etc., application development firms and developers may need to spend a lot of time and cost to develop the application by each platform. Accordingly, there is a rising interest in a technology for developing a client application that is not limited to a specific platform by one-time development.

The conventional technology for developing a client application under a general cross-platform environment is a technology that allows a client application which is operable on a specific platform to operate on a heterogeneous platform different from the specific platform. More specifically, according to the conventional technology for developing a client application under the cross-platform environment, a method for providing a virtual platform operable on a platform and allowing a client application to be operable on the virtual platform was provided to thereby allow the client application to be operable on a heterogeneous platform. For example, a technology of Java™ virtual machine and a technology of web application operating on a web browser are included herein.

However, since the client applications developed on such a separate platform cannot access a unique resource of the heterogeneous platform, it is difficult to use the unique functions of the heterogeneous platform (e.g., a native API and its unique UI's characteristic elements on each platform) through the UI that does not consider different characteristics of the platforms. Consequently, this may lead users to feel out of place and/or cause a problem of performance degradation due to the difficulty in using a native API of each platform.

Further, since companies have to develop each application by going through separate development processes by each individual platform, this may cause them to hire different developers by each individual platform and to spend many times to develop respective applications according to information on the platform. Thus, the cost of production may inevitably grow too high.

SUMMARY OF THE INVENTION

It is an object of the present invention to allow UI, provided by automatically-generated UI code that operates on a target platform among multiple platforms with information on consistent UI, to have unique characteristics of the target platform and have a same performance as a native application of the target platform while shortening development time.

Further, it is another object of the present invention to provide a development environment customized for the target platform by generating and managing UI code and business logic code, respectively.

In accordance with one aspect of the present invention, there is provided a method for providing a framework to develop a client application executed on multiple platforms, including steps of: (a) an apparatus for providing a framework acquiring information on platform independent user interface (UI) and information on business logic written by using a general-purpose programming language; and (b) the apparatus performing (i) a process for generating a platform-dependent UI code corresponding to the acquired information on the platform independent UI as UI code for a target platform among the multiple platforms and (ii) a process for generating business logic code corresponding to the acquired information on the business logic as business logic code for the target platform.

In accordance with another aspect of the present invention, there is provided an apparatus for providing a framework to develop a client application executed on multiple platforms, including: a communication part for acquiring information on platform independent UI and information on business logic written by using a general-purpose programming language; and a processor for performing (i) a process for generating a platform-dependent UI code corresponding to the acquired information on the platform independent UI as UI code for target platform among the multiple platforms and (ii) a process for generating business logic code corresponding to the acquired information on the business logic as business logic code for the target platform.

BRIEF DESCRIPTION OF THE DRAWINGS

To show technical solutions more clearly in accordance with example embodiments of the present invention, drawings required to be used in explanation of example embodiments will be simply described. Of course, the drawings to be shown below are just some of the example embodiments of the present invention and other drawings may be obtained based on the drawings without inventions of those skilled in the art.

DETAILED DESCRIPTION OF THE PREFERRED EMBODIMENTS

Figure 1:
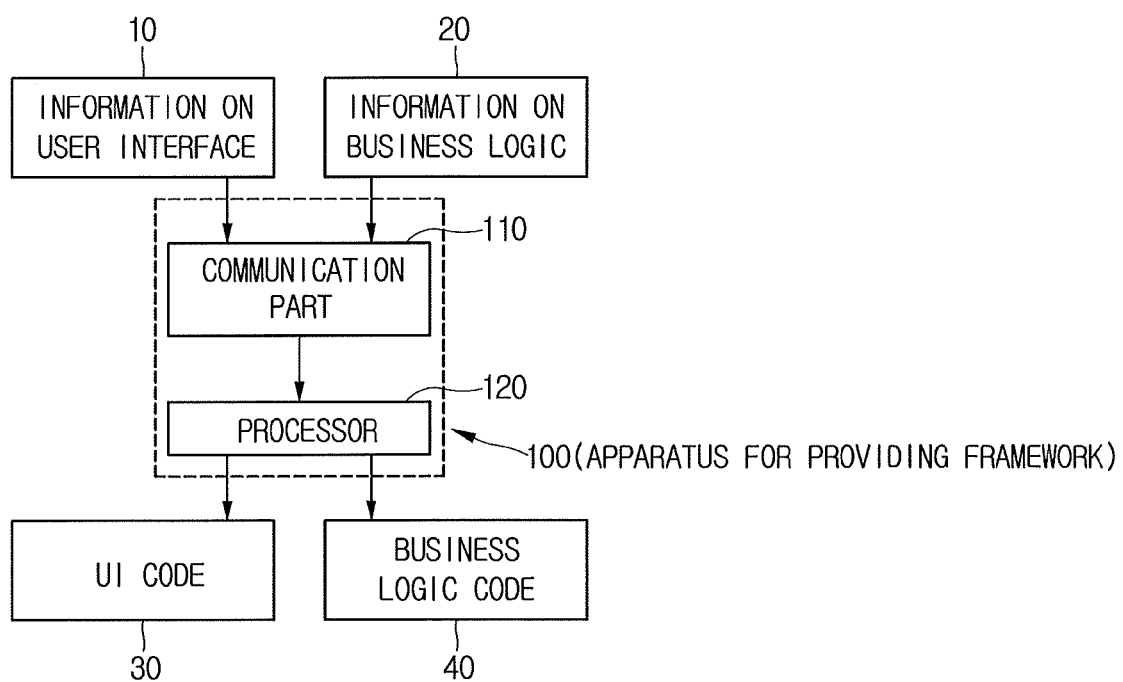
FIG. 1 is a drawing exemplarily explaining an operation of an apparatus for providing a framework to develop a client application executed on multiple platforms in accordance with one example embodiment of the present invention.

To make purposes, technical solutions, and advantages of the present invention clear, more detailed example embodiments will be explained by referring to the accompanying drawings. These embodiments are described in sufficient detail to enable those skilled in the art to practice the invention.

In addition, in accordance with the specification and the claims of the present invention, words "comprise", "include" and their modifications are not intended to exclude other technical characteristics, additions, components or steps. Following embodiments and drawings will be provided as examples and will not be intended to limit the present invention.

Further, it is to be understood that the various embodiments of the present invention, although different, are not necessarily mutually exclusive. For example, a particular feature, structure, or characteristic described herein in connection with one embodiment may be implemented as other embodiments without departing from the spirit and scope of the present invention. In addition, it is to be understood that the position or the arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Unless otherwise expressed in this specification or apparently contradictory to the context, a singular item may encompass plural ones.

To allow those skilled in the art to the present invention to be carried out easily, the example embodiments of the present invention will be explained by referring to attached diagrams in detail as follows:

FIG. 1 is a drawing exemplarily explaining an operation of an apparatus for providing a framework to develop a client application executed on multiple platforms in accordance with one example embodiment of the present invention.

By referring to FIG. 1, the apparatus 100 for providing the framework may include a communication part 110 and a processor 120.

More specifically, the communication part 110 may acquire information 10 on user interface (UI) and information 20 on business logic.

Besides, the processor 120 may generate UI code 30 corresponding to the information 10 on the UI acquired by the communication part 110 and generate business logic code 40 corresponding to the information 20 on the business logic acquired by the communication part 110. It may include a UI generator to perform a process of generating the UI code 30, and a logic translator to perform a process of generating the business logic code 40.

Figure 2:
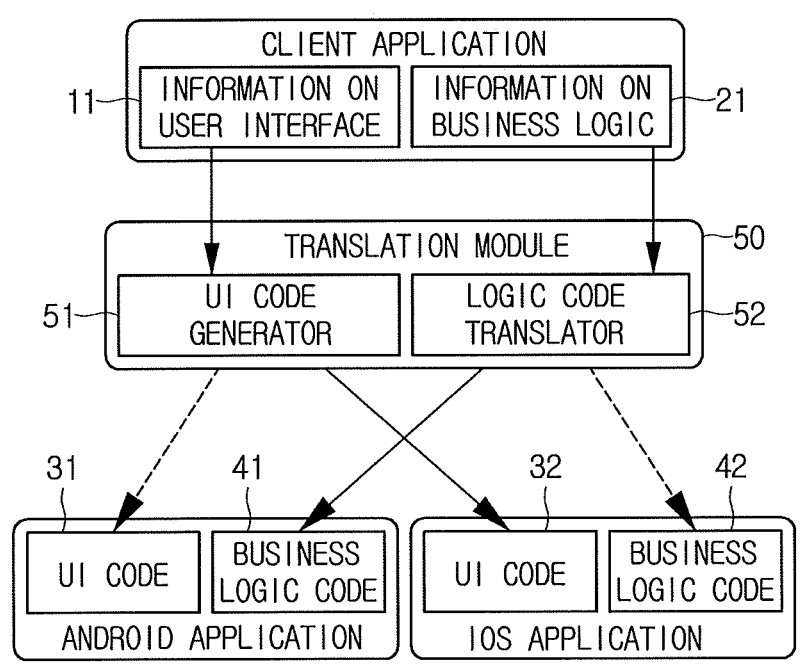
FIG. 2 is a concept diagram exemplarily illustrating a process of generating a client application appropriate for an individual platform by the apparatus for providing the framework of FIG. 1 in accordance with one example embodiment of the present invention.

FIG. 2 is a concept diagram exemplarily illustrating a process of generating a client application appropriate for a target platform selected among multiple platforms (e.g., Android, iOS, etc.) by the apparatus 100 of FIG. 1 in accordance with one example embodiment of the present invention.

By referring to FIG. 2, the client application used by a developer, a translation module 50 included in the apparatus 100, an Android application and an iOS application as examples of individual platforms are illustrated.

More specifically, the client application includes information 11 on UI and information 12 on business logic. The translation module 50 includes a UI code generator 51, and a logic code translator 52. The Android application and the iOS application include their corresponding UI codes 31 and 32 and corresponding business logic codes 41 and 42.

More concretely, the information 11 on the UI may perform a function of supporting an interaction with a user, and the information 12 on the business logic may correspond to a handling routine inside the application, respectively.

Next, if a developer writes the information 11 on the UI and the information 21 on the business logic of the client application through the framework, the information 11 on the UI and the information 21 on the business logic, after being inputted in the apparatus 100 through the communication part 110, are converted into the UI codes 31 and 32 and the business logic codes 41 and 42 appropriate for the individual platforms through the UI code generator 51 and the business logic code translator 52, respectively, performed by the processor 120.

For reference, while the business logic codes 41 and 42 are relatively platform independent because elements and methods supported by the respective business logic codes 41 and 42 are not much different (although different programming languages are used by the individual platforms), the UI codes 31 and 32 may be relatively platform dependent because elements or methods for supporting the elements are much different by the individual platforms.

To configure the platform-independent UI of the client application, the apparatus 100 may allow a developer to write program code by using the information on UI that defines independent UI elements. The information on the UI may be written in a markup language such as SGML, HTML, XML, XHTML, SVG, MathML, MXML, XAML, TEX, LATEX, PTEX, JSON, and SAMI.

More specifically, the information on the UI may include manifest information, metadata information, resources such as images, videos, and colors and other information related to the UI. Herein, the manifest information represents information on the whole application, etc. For example, information on a name of the application or a target platform to convert is described in the manifest information. Meanwhile, information on screen configuration of the application such as information on a layout of a specified page is described in the metadata information.

Figure 3:
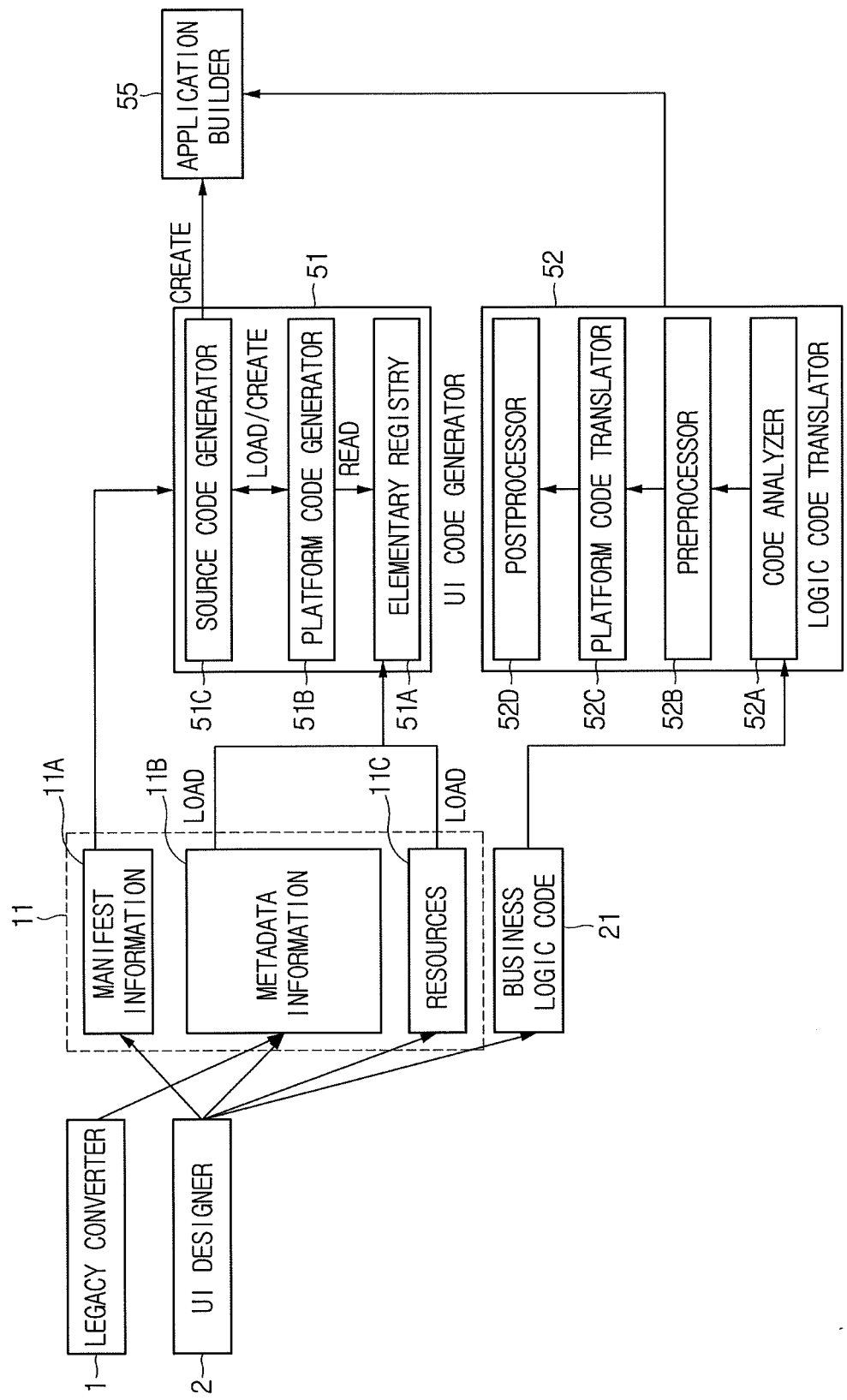
FIG. 3 is a block diagram illustrating the apparatus for providing the framework in more details in accordance with one example embodiment of the present invention.

FIG. 3 is a block diagram illustrating the apparatus 100 for providing the framework in more details in accordance with one example embodiment of the present invention.

By referring to FIG. 3, the apparatus 100 may include a legacy converter 1, the UI code generator 51, the logic code translator 52 and an application builder 55.

Concretely, the legacy converter 1 is a component capable of converting UI of an existing application into a form of the information on the UI provided on the framework in order to support the existing application to be executed on a variety of platforms. In accordance with the present invention, since the business logic uses only one general-purpose programming language, it is possible to convert the existing application into one to be executed on the multiple platforms only by changing the UI of the existing application in use of the legacy converter 1 without any change in the business logic. However, the legacy converter 1 may not be included in the apparatus 100 as the case may be.

Next, the UI code generator 51 performs a process of receiving information on UI written by a developer or converted by the legacy converter 1, generating UI codes appropriate for the individual platforms, and storing them in a form of file and it will be explained in more detail as shown below.

First, manifest information 11A, metadata information 11B and other information related to the UI (non-illustrated) are delivered to the UI code generator 51 with resources 11C including images, videos, colors, etc. The above-mentioned information is parsed and then stored in elementary registry 51A. A platform code generator 51B reads the information stored in the elementary registry 51A and generates UI code appropriate for a target platform designated in the manifest information 11A. The generated UI code corresponding to the target platform may be received and converted into a source code file of a corresponding platform by a source code generator 51C and then delivered to an application builder 55.

Next, a process of converting information on business logic written by using one general-purpose programming language into logic code appropriate for the target platform and storing it in a form of file may be executed by the logic code translator 52. More detailed explanation will be made as follows:

First, a code analyzer 52A receives the business logic code written by the developer and parses it in a form of tree structure. After that, a preprocessor 52B may perform tasks including code optimization such as deleting dead code that exists in the logic but actually cannot be executed. A platform code translator 52C converts the code processed by the preprocessor 52B into logic code appropriate for the target platform and then delivers it to a postprocessor 52D. The postprocessor 52D performs an additional task designated by the target platform. The code processed by the postprocessor 52D may be finally converted into the logic code on the target platform and be delivered to the application builder 55.

Eventually, the application builder 55 complies the UI code and the logic code appropriate for the target platform received from the UI code generator 51 and the logic code translator 52 respectively and then generates an application executable on the target platform. The UI code and the logic code may be linked or complied by the application builder 55 included in the apparatus 100 or by a compiler provided to the target platform and thereby the client application in an executable form is generated. For reference, a compiler could also include a linker.

The advantages of the technology explained herein as the example embodiment include: that it is possible to write information on common UI capable of generating UI code appropriate for the target platform at a time, and that the UI code generated through the information on the UI is linked or compiled with the business logic code translated from general-purpose programming language to be appropriate for the target platform to thereby establish final code set with which a client application can be generated.

In accordance with the present invention, it is possible to develop the client application more efficiently while the UI appropriate for each platform is provided such that a user is prevented from feeling out of place by allowing native API of each platform to be used.

Besides, in accordance with the present invention, a development environment customized for the platform may be provided by generating and managing the UI code and the business logic code, respectively.

Further, in accordance with the present invention, a performance may be identical to that of the native application.

As well, in accordance with the present invention, a productivity and a convenience may be improved because an application appropriate for a variety of platforms can be provided through the one-time development.

Furthermore, in accordance with the present invention, if it is necessary to improve or add the functions of the application during the operation, the maintenance costs can be reduced.

It can be clearly understood by those skilled in the art based on explanation of the aforementioned example embodiment that the present invention will be achieved through combination of software and hardware or through hardware only but it will be mainly achieved in the former case. The objects under the technical solution of the present invention or contribution over the prior art may be expressed in a form of software and the computer software products may be stored in computer-recordable storage media such as floptical disk, hard disk, or optical disk and computing devices (which may be a personal computer, a server, a network device, etc.) include several instructions of the aforementioned method to perform the method in accordance with a variety of example embodiments of the present invention or configure general-purpose hardware devices as an apparatus of the present invention to implement the system mentioned in a variety of example embodiments of the present invention. The general-purpose hardware devices include memory such as ROM and RAM specially designed to store instructions, and a processor such as CPU configured to be combined with the memory and execute instructions stored in the memory and may have a communication part encompassing a keyboard, a mouse, other external input devices or storage to receive the codes written by developers.

As the explanation as shown above will be only one executable example embodiment of the present invention but will not be intended to limit the present invention, random modifications, equivalent alternatives, and improvements will have to be included within the protective scope of the present invention.

What is claimed is:

1. A method for providing a framework to develop a client application executed on multiple platforms, comprising steps of:
   (a) providing a framework acquiring information on platform independent user interface (UI) and information on business logic written by using a general-purpose programming language;
   (b)
   (i) generating a platform-dependent UI code, via a UI code generator, corresponding to the acquired information on the platform independent UI as UI code for a target platform among the multiple platforms and
   (ii) generating business logic code, via a logic code generator, corresponding to the acquired information on the business logic as business logic code for the target platform; and
   (c) generating a client application executable on the target platform by using the generated UI code and the generated business logic code,
   wherein the UI code generator including an elementary registry, a platform code generator, and a source code generator;

wherein:
(i)
(A) the acquired UI information is delivered to the UI code generator, and the information is parsed and stored in the elementary registry,
(B) the platform code generator reads the information stored in the elementary registry and generates UI code appropriate for a target platform,
(C) and the source code generator converts the UI code appropriate for the target platform into a source code file for the target platform and then delivers the source code file to an application builder;
(ii)
(A) the acquired business logic information is parsed by a code analyzer of a logic code translator, wherein the logic code translator further including a preprocessor, a platform code translator, and a postprocessor,
(B) the preprocessor performs code optimization tasks,
(C) the platform code translator converts code processed by the preprocessor into logic code appropriate for the target platform and delivers the code to the postprocessor,
(D) and the postprocessor converts the business logic code into a logic code file by performing additional tasks designated for the target platform and then delivers the logic code file to the application builder;
(iii) the application builder compiles the acquired source code file and the logic code file to thereby generate a client application executable on the target platform.

2. The method of claim 1, wherein the generated UI code is UI code that uses native application programming interface (API) of the target platform.

3. The method of claim 1, wherein at least some of the information on the platform independent UI is written in a markup language.

4. The method of claim 3, wherein the markup language includes at least one of Standard Generalized Markup Language (SGML), Hypertext Markup Language (HTML), Extensible Markup Language (XML), Extensible Hypertext Markup Language (XHTML), Scalable Vector Graphics (SVG), Mathematical Markup Language (MathML), MXML, Extensible Application Markup Language (XAML), TEX, Lamport TEX (LATEX), PTEX, JavaScript Object Notation (JSON), and Synchronized Accessible Media Interchange (SAMI) that define independent UI elements without being dependent on a corresponding platform.

5. The method of claim 1, wherein the process for generating the business logic code includes optimizing the code.

6. The method of claim 1, before the step of (a), further comprising a step of the apparatus converting an already written UI code into the information on the platform independent UI to be used at the step of (a) by using a legacy converter.

7. An apparatus for providing a framework to develop a client application executed on multiple platforms, comprising:
a communication part for acquiring information on platform independent user interface (UI) and information on business logic written by using a general-purpose programming language;
a processor for performing
(a) a process for generating a platform-dependent UI code, via a UI code generator, corresponding to the acquired information on the platform independent UI as UI code for a target platform among the multiple platforms and
(b) a process for generating business logic code corresponding to the acquired information on the business logic as business logic code for the target platform; and
the processor generating a client application executable on the target platform by using the generated UI code and the generated business logic code,
wherein the UI code generator including an elementary registry, a platform code generator, and a source code generator;
wherein:
(i)
(A) the acquired UI information is delivered to the UI code generator, and the information is parsed and stored in the elementary registry,
(B) the platform code generator reads the information stored in the elementary registry and generates UI code appropriate for a target platform,
(C) and the source code generator converts the UI code appropriate for the target platform into a source code file for the target platform and then delivers the source code file to an application builder;
(ii)
(A) the acquired business logic information is parsed by a code analyzer of a logic code translator, wherein the logic code translator further including a preprocessor, a platform code translator, and a postprocessor,
(B) the preprocessor performs code optimization tasks,
(C) the platform code translator converts code processed by the preprocessor into logic code appropriate for the target platform and delivers the code to the postprocessor,
(D) and the postprocessor converts the business logic code into a logic code file by performing additional tasks designated for the target platform and then delivers the logic code file to the application builder;
(iii) the application builder compiles the acquired source code file and the logic code file to thereby generate a client application executable on the target platform.

8. The apparatus for claim 7, wherein the generated UI code is UI code that uses native application programming interface (API) of the target platform.

9. The apparatus for claim 7, wherein at least some of the information on the platform independent UI is written in a markup language.

10. The apparatus for claim 9, wherein the markup language includes at least one of Standard Generalized Markup Language (SGML), Hypertext Markup Language (HTML), Extensible Markup Language (XML), Extensible Hypertext Markup Language (XHTML), Scalable Vector Graphics (SVG), Mathematical Markup Language (MathML), MXML, Extensible Application Markup Language (XAML), TEX, Lamport TEX (LATEX), PTEX, JavaScript Object Notation (JSON), and Synchronized Accessible Media Interchange (SAMI) which define independent UI elements without being dependent on a corresponding platform.

11. The apparatus for claim 7, wherein the process for generating the business logic code includes optimizing the code.

12. The apparatus for claim 7, wherein the processor converts an already written UI code into the information on the platform independent UI to be aid by using a legacy converter.

* * * * *